(12) United States Patent
Fry et al.

(10) Patent No.: US 12,024,147 B2
(45) Date of Patent: Jul. 2, 2024

(54) TRAILER BRAKING SYSTEM

(71) Applicant: KNORR-BREMSE Systeme fuer Nutzfahrzeuge GmbH, Munich (DE)

(72) Inventors: Matthew Fry, Munich (DE); Martin Mederer, Munich (DE); Stefan Pahl, Munich (DE); Florian Finkl, Munich (DE); Thomas Steer, Munich (DE); Christian Staahl, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 379 days.

(21) Appl. No.: 17/596,011

(22) PCT Filed: May 3, 2020

(86) PCT No.: PCT/EP2020/062229
§ 371 (c)(1),
(2) Date: Dec. 1, 2021

(87) PCT Pub. No.: WO2020/225168
PCT Pub. Date: Nov. 12, 2020

(65) Prior Publication Data
US 2022/0340111 A1    Oct. 27, 2022

(30) Foreign Application Priority Data

May 3, 2019   (GB) .................................. 1906312

(51) Int. Cl.
*B60T 8/32*        (2006.01)
*B60T 8/88*        (2006.01)
(Continued)

(52) U.S. Cl.
CPC ............ *B60T 8/323* (2013.01); *B60T 13/385* (2013.01); *B60T 13/683* (2013.01);
(Continued)

(58) Field of Classification Search
CPC ...... B60T 8/1708; B60T 8/1764; B60T 8/323; B60T 8/885; B60T 8/94; B60T 13/683;
(Continued)

(56) References Cited

U.S. PATENT DOCUMENTS 4,585,278 A    4/1986  Grauel et al.
5,333,940 A *  8/1994  Topfer .................... B60T 8/327
                                                    303/9.62
(Continued)

FOREIGN PATENT DOCUMENTS

CN           1898113 A       1/2007
CN         101410284 A       4/2009
(Continued)

OTHER PUBLICATIONS

Chinese-language Office Action issued in Chinese Application No. 202080033461.2 dated Mar. 28, 2023 with English translation (13 pages).

(Continued)

*Primary Examiner* — Thomas J Williams
(74) *Attorney, Agent, or Firm* — Crowell & Moring LLP

(57) ABSTRACT

A brake system for a trailer has first and second pneumatic circuits for supplying air pressure to the wheel ends on the trailer. The air pressure to brake devices at the wheel ends is controllable via a first brake ECU. First and second pressure control valves control pressure from the pneumatic circuits to the respective wheel ends. The system further has a second ECU adapted to electrically control the actuation of the pressure control valves.

11 Claims, 7 Drawing Sheets

(51) Int. Cl.
  *B60T 13/38* (2006.01)
  *B60T 13/68* (2006.01)
  *B60T 15/02* (2006.01)
  *B60T 8/94* (2006.01)

(52) U.S. Cl.
  CPC ............ *B60T 15/027* (2013.01); *B60T 8/885* (2013.01); *B60T 8/94* (2013.01); *B60T 2240/00* (2013.01); *B60T 2270/402* (2013.01); *B60T 2270/413* (2013.01)

(58) Field of Classification Search
  CPC .... B60T 13/385; B60T 15/027; B60T 17/221; B60T 2240/00; B60T 2270/402; B60T 2270/413
  See application file for complete search history.

(56) References Cited

U.S. PATENT DOCUMENTS

| | | |
|---|---|---|
| 5,549,362 A | 8/1996 | Broome |
| 2004/0084963 A1* | 5/2004 | Costello .................. B60T 1/10 307/9.1 |
| 2004/0183372 A1 | 9/2004 | Heuer et al. |
| 2005/0137767 A1 | 6/2005 | Goebels et al. |
| 2005/0162006 A1 | 7/2005 | Nilsson et al. |
| 2007/0170774 A1* | 7/2007 | Gerum .................. B60T 13/66 188/140 R |
| 2007/0236077 A1 | 10/2007 | Schweikert et al. |
| 2010/0066161 A1 | 3/2010 | Fry et al. |
| 2012/0283925 A1 | 11/2012 | Barlsen et al. |
| 2018/0111591 A1 | 4/2018 | Fry et al. |
| 2018/0354478 A1 | 12/2018 | Eckert |
| 2019/0337503 A1 | 11/2019 | Otremba |
| 2020/0139952 A1 | 5/2020 | Van Thiel |
| 2021/0370898 A1 | 12/2021 | Eckert |
| 2022/0219663 A1* | 7/2022 | Fry .......................... B60T 8/885 |
| 2022/0340111 A1* | 10/2022 | Fry ......................... B60T 8/1708 |

FOREIGN PATENT DOCUMENTS

| | | | |
|---|---|---|---|
| CN | 107531224 A | 1/2018 | |
| CN | 107921945 A | 4/2018 | |
| CN | 108025723 A | 5/2018 | |
| CN | 108349471 A | 7/2018 | |
| CN | 109789859 A | 5/2019 | |
| DE | 43 27 759 A1 | 3/1995 | |
| DE | 10 2009 031 785 A1 | 1/2011 | |
| DE | 10 2014 113 056 A1 | 3/2016 | |
| DE | 10 2016 012 925 A1 | 5/2018 | |
| DE | 10 2017 005 979 A1 | 9/2018 | |
| DE | 10 2017 118 529 A1 | 2/2019 | |
| EP | 0 586 203 A2 | 3/1994 | |
| EP | 2 459 421 B1 | 3/2013 | |
| EP | 2 123 528 A2 | 3/2016 | |
| EP | 3 444 155 B1 | 8/2020 | |
| GB | 2 450 468 A | 12/2008 | |
| GB | 2492124 A | 12/2012 | |
| GB | 2505948 A | 3/2014 | |
| GB | 2543037 A * | 4/2017 | ............ B60T 13/263 |
| GB | 2557424 A | 6/2018 | |
| WO | 2017/050632 A1 | 3/2017 | |

OTHER PUBLICATIONS

European Office Action issued in European Application No. 20725643.9 dated Jun. 20, 2023 (4 pages).
International Search Report (PCT/ISA/210) issued in PCT Application No. PCT/EP2020/062229 dated Jul. 6, 2020 (three (3) pages).
Written Opinion (PCT/ISA/237) issued in PCT Application No. PCT/EP2020/062229 dated Jul. 6, 2020 (seven (7) pages).
British Search Report issued in Great Britain Application No. GB1906312.2 dated Oct. 4, 2019 (two (2) pages).
British Search Report issued in Great Britain Application No. GB1906312.2 dated Apr. 28, 2020 (two (2) pages).
Chinese-language Office Action issued in Chinese Application No. 202080033461.2 dated Jan. 18, 2024 with English translation (10 pages).
European Office Action issued in European Application No. 20 725 643.9 dated Apr. 19, 2024 (6 pages).

* cited by examiner

TRAILER BRAKING SYSTEM

BACKGROUND AND SUMMARY OF THE INVENTION

The invention relates to a braking system, in particular for a towed vehicle such as a three axle semi-trailer or full trailer.

Motor vehicle technology is increasingly making use of digitization and one of the main strands of development is in the area of autonomous or highly automated vehicles, in which functions currently carried out by the driver will be replaceable by automated systems on the vehicle. This automation generally requires integration of additional functions sensors and electrical and electronic subsystems. As vehicles are more fully automated, the general acceptance of or at least toleration of road accidents with drop significantly as errors by machines or electronic are less accepted than the generic problem of driver error.

An additional issue for operators is that the trailer will become more expensive as a capital good, even if total operational costs are reduced, and so there will be pressure on the owner to increase the availability of the trailer for use. Therefore, compared to known trailer vehicles, the level of safety should be increased and the availability, performance of critical functions ensured and error rates reduced.

Problems with trailer safety systems can be generally divided into pneumatic problems or errors and electrical problems or errors. Examples of pneumatic problems include; decoupling or rupture of the supply, which will lead to the triggering of the emergency brake; rupture of the control line, which will lead to the triggering of the emergency brake via the truck trailer control module; rupture of the main reservoir on the trailer leading to decompression of the supply line, which if the leak is large enough will lead to the emergency brake being triggered and finally failure of a valve or similar, which will result in one of the typically two brake channels being unable to sustain the intended brake pressure, which in turn leads to asymmetric brake forces and potential vehicle instability.

Examples of modes of electrical failure include a failure of the power supply e.g. due to a disconnected cable or an ECU failure. In either case, the electronic braking system operation would be inoperative with the loss of ABS and RSP functions and brake response times increased.

In an automated driving use case any single fault described above would force the vehicle combination to an uncontrolled and immediate stop (potentially causing an accident), a severe speed reduction and/or stop on the Highway or a loss of legally required braking functionality (ABS, RSP) and a potentially dangerous condition of the vehicle when emergency brake actuations or braking in non-optimal conditions is required.

GB2557424 discloses a known braking system in which a commercial vehicle electronic braking and communication system for a trailer has a connector to connect the system to a prime mover. The connector comprises an electronic control module with a first ISO7638 compliant databus connection, which carries braking related data signals and to which a brake pressure control device is attached. The connector also comprises a second databus ISO12098 compliant connection, which carries data relating to non-braking functions, such as lighting, camera, object detection (radar, lidar, ultrasonic). The trailer braking and communication system may act as a combined brake, brake and chassis control, lighting and autonomous driving controller.

A further known trailer braking system is disclosed in GB2505948.

The present invention aims to improve vehicle brake system performance in the event of failures.

According to a first aspect of the invention there is provided a trailer braking system in accordance with the independent claim.

Further advantageous embodiments can be found in the dependent claims.

According to a second aspect of the invention there is provided a method of operating the brakes on a trailer with the independent claim.

The invention provides for an increased level of safety and improves the availability and performance of critical functions. In preferred embodiments, the provision of pressure control valves in series with an existing brake system provides redundant stability functionality, which can also protect parts of the brake system in the event of failure. In a further preferred embodiment, a selection valve advantageously can distribute available brake pressure in the event of failure. Preferably, the system uses the two brake system ECUs to provide redundant power and communication management.

In the second aspect, the invention advantageously uses a trailer control module in the towing vehicle as a redundant brake pressure generator.

Exemplary embodiments of the invention, in which like parts are described with like numbers, will now be described in greater detail.

DETAILED DESCRIPTION OF THE DRAWINGS

Figure 1:
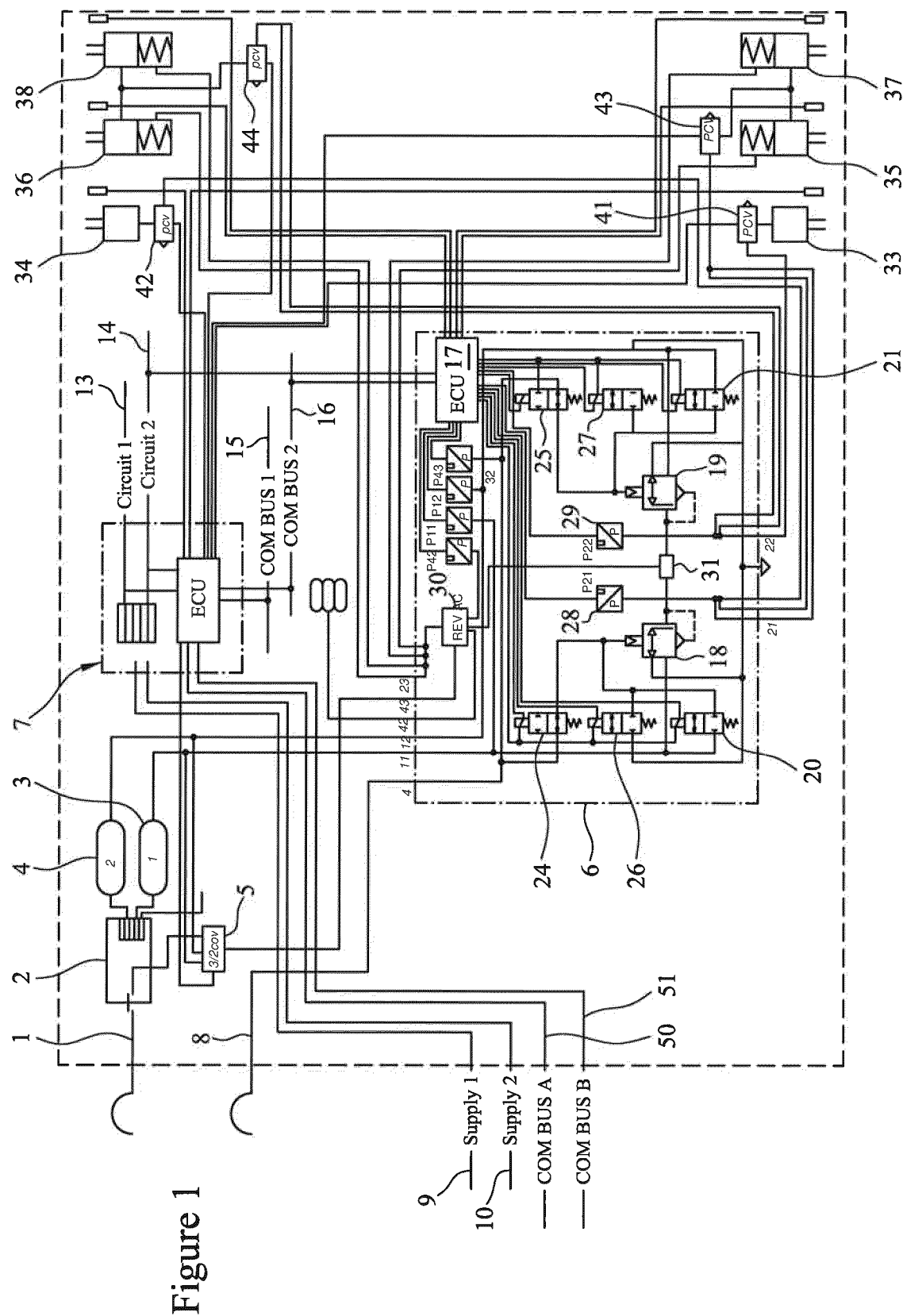
FIG. 1 shows a first embodiment of a trailer brake system with redundancy.

FIG. 1 shows a block diagram of a redundant trailer brake system comprising a first pneumatic connection 1 for service braking (red line) connected to a selector valve 2, which controls air flow in use into first and second reservoirs 3, 4, arranged in parallel to one another and a further output to a selector valve 5. The selector valve 5 receives further pneumatic inputs from the respective outputs of the first and second reservoirs 3,4 and has an output to the primary trailer brake module 6. The selector valve 5 is adapted to supress activation of the emergency function in the trailer brake module 6 so that the trailer brake module can continue to function in the event of pressure loss.

The trailer brake system further comprises a second pneumatic connection 8 for control (yellow line), which is connected to the primary trailer brake module 6. First and second electrical connections 9, 10 supply power to the main electronic control unit (ECU) 7. The system is further provided with first and second communication bus connections 50, 51 towards the towing vehicle connected to main ECU 7. It will be appreciated that the first electrical connection 9 and the first communication bus 50 may be combined in a single electrical connector such as the ISO7638 and the second electrical connection 10 and the second communication bus 51 may be combined in a single electrical connector such as the ISO12098. The main ECU 7 provides power management of the first and second electrical connection 9, 10 and provides two local trailer power circuits 13, 14 where circuit-1 13 provides power to the secondary brake control module 52 and circuit-2 14 provides power to the primary brake control module 6. The main ECU 7 additionally provides first and second local communication circuits 15, 16 and is the gateway between the local buses and first and second communication buses.

The ECU 7 is operatively connected to the selector 5 to provide the necessary control signals.

The primary trailer brake module 6 receives the first and second pneumatic inputs from the first and second reservoirs, which inputs are connected to a respective relay valve 18,19 and a respective 2/2 solenoid load valve 20,21. Each of the said pneumatic connections is provided with a respective pressure transducer 22,23, which is electrically connected to the ECU 17. The control line provides a respective further pneumatic input for the relay and emergency anti compounding valve 30, which is also connected to a shuttle valve 31 located pneumatically between the two relay valves 18,19. A further transducer 32 is provided on the control line input, which transducer is connected to the ECU 17.

On each of the two brake channels a respective further two 2/2 solenoid backup valve 24,25 are provided and each of the backup valves is connected to a respective load valves 20, 21 and exhaust valve 26,27, which are connected to a conduit to exhausts. The solenoid valves pilot the two relay valves 18,19, the outputs of which are supplied to ports 21 22 to provide the pressure to the trailer brakes. A respective transducer 28,29 is provided in the pneumatic pathway from the relay valve to the brake channels, with the transducer electrical signals being connected to the ECU 17. Each of the back-up, load and exhaust valves is controlled from the ECU 17 by way of respective electrical connections.

In the illustrated embodiment the trailer is provided with three axles having a respective brake 33-38 on each wheel end. Axles 2 and 3 (the two rear axles) are each provided with a spring brake, which is pneumatically connected to the output of the relay emergency anti compounding valve 30, so that the spring brakes can be independently controlled. A wheel speed sensor is associated with each wheel end, the output of which for axle 1 is passed to the main ECU 7, axles 2 and 3 are passed to the primary trailer brake module ECU 17.

Control of the flow of air to the wheel ends via a first pressure control valve assembly 41,42 for the front axle and a second pressure control valve assembly 43, 44 for each side of the two rear axles. Each of these pressure control valve assemblies is a combination of two 2/2 solenoid valves, one of which is normally open and the other normal closed (which connects out to exhaust). The pressure control valve assembly is electrically controlled via the main ECU 7.

Figure 2:
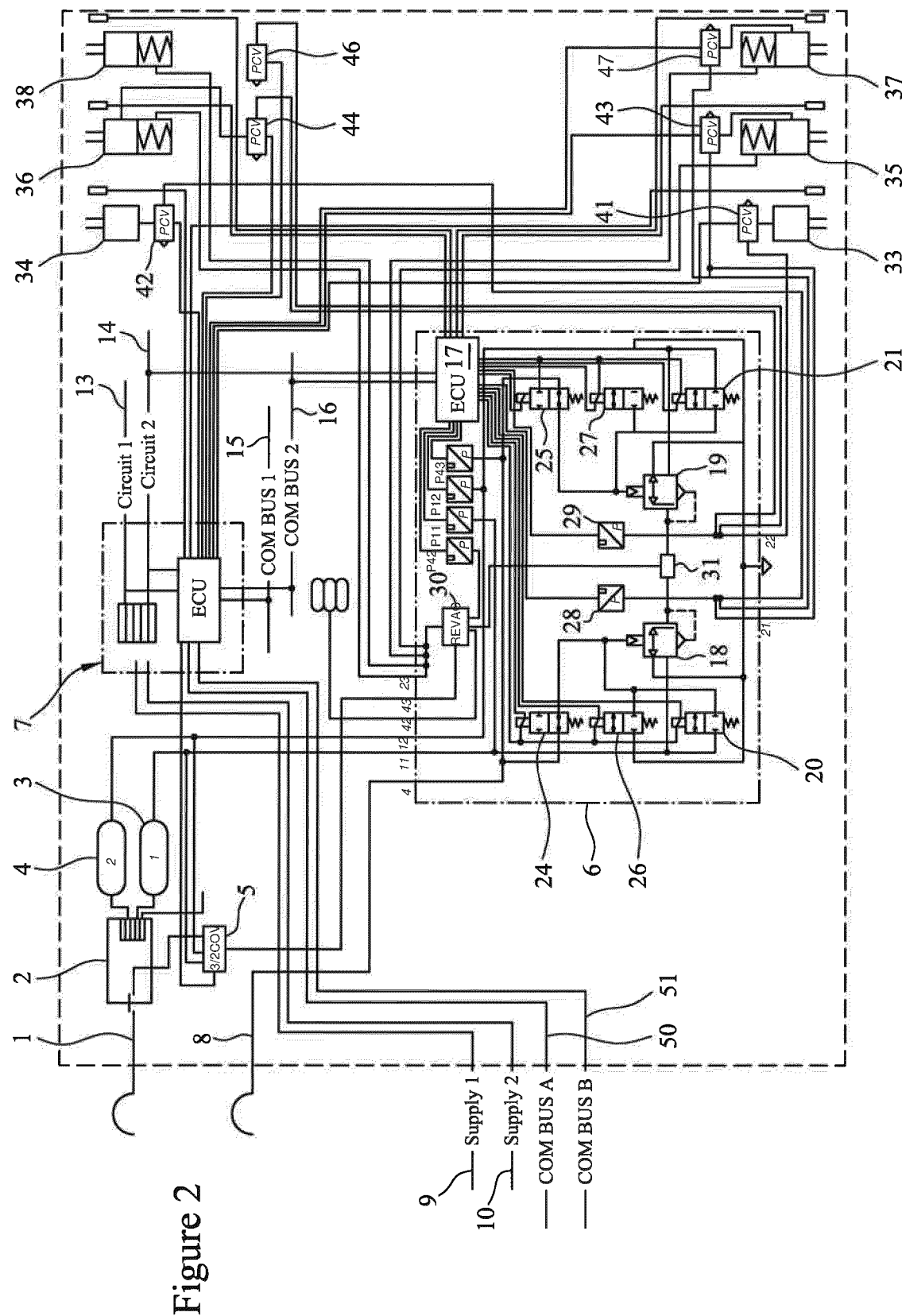
FIG. 2 shows a second embodiment of a trailer brake system.

FIG. 2 shows a similar arrangement to FIG. 1 but having one pressure control valve assembly 41-46 per wheel end.

In the embodiments of FIGS. 1 and 2, in contrast to known conventional systems which map the TBM output channels to the vehicle wheels, the trailer brake module is connected to two wheels on the left side and one on the right or vice versa. Coordinated control of the pressure control valves and the trailer brake module (TBM) allows side wise control of the vehicle brakes. In case of any individual faults mentioned above the consequences and response strategy is summarized below.

| Fault | Consequence/Response Strategy |
| --- | --- |
| Supply/control line decoupling, | Full brake system functionality is still available. As long as sufficient air supply is available in circuit 1 and 2, the emergency function is suppressed by means of the selector valve 5. |
| Rupture of the main reservoir/TBM pneumatic failure | This will affect circuit 1 or 2. Brake functionality remains on one of the output channels. At least one wheel on each side of the vehicle can still braked. |
| Service brake actuator rupture/pneumatic line failure | This will affect circuit 1 or 2. The PCVs can be used to isolate the fault. In the case of the layout in FIG. 1 two or one wheels depending on affected wheel. In the case of the layout FIG. 2 the fault can always be isolated to a single wheel and brake functionality remains on all other wheels. |
| Power supply failure | The TBM enters pneumatic mode. The main ECU requests brake pressure via the communication bus to the towing vehicle and the TCM on the towing vehicle provides brake pressure on the control line. The PCVs are used to lower pressure if required. This means that ABS and RSP (with longer response time) is possible. With appropriate coordination between main ECU and TCM, load dependent brake control is also possible. |
| TBM ECU failure | Equivalent to power supply failure |

Figure 3:
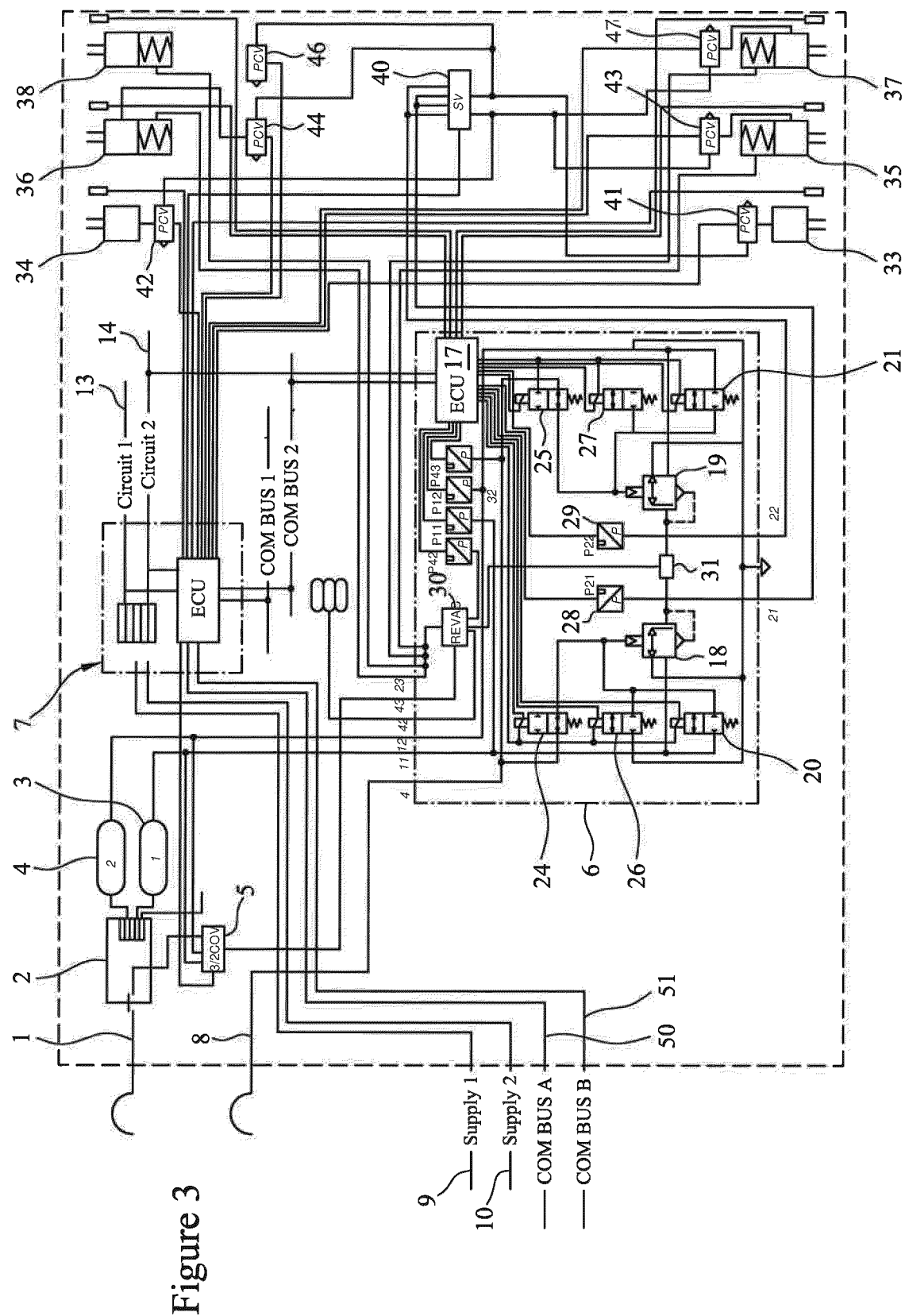
FIG. 3 shows a third embodiment of a trailer brake system.

FIG. 3 shows a further embodiment having a selector valve 40, in which like parts are numbered as in FIGS. 1 and 2.

The pneumatic output of the trailer brake module is fed to a selector valve 40. The selector valve controls the flow of air to the wheel ends via a respective pressure control valve assembly 41-46. Each of these is a combination of two 2/2 solenoid valves, one of which is normally open and the other normal closed (which connects out to exhaust). The pressure control valve assembly and the selector valve 40 are electrically controlled via the main ECU 7.

The selector valve 40 is a set of two or three 3/2 valves that selects one source out of an available two for two different output channels. The first variant has two 3/2 valves and the service brake output of the trailer brake module connected to its four input ports. The four input ports connect to the two 3/2 valves so that each as one input from the first brake circuit and one from the second brake circuit. The output from the 3/2 valves connects to the output of the selection valve. The second variant has the functionality of the first variant and in addition a third 3/2 provides the same type of selection functionality for the two supply circuits.

As can be seen above, the brake system suffers the greatest functional degradation in case of rupture of the main reservoir/TBM pneumatic failure. The introduction of the selection valve aims to improve performance in this case.

The selection valve and a vehicle system with it is illustrated in FIG. 3. With the selection valve the output from the TBM can be mapped to either of the brake circuits. The response strategy in Table 1 is still valid with one exception described below:

Fault Consequence/Response Strategy

Rupture of the main reservoir/TBM pneumatic failure
This will affect circuit 1 or 2. If circuit 1 is affected, the selection valve will be switched into a position so that circuit 2 is mapped to both brake circuit 1 and 2. If circuit 2 is affected, the selection valve will be switched into a position so that circuit 1 is mapped to both brake circuit 1 and 2.

Figure 4:
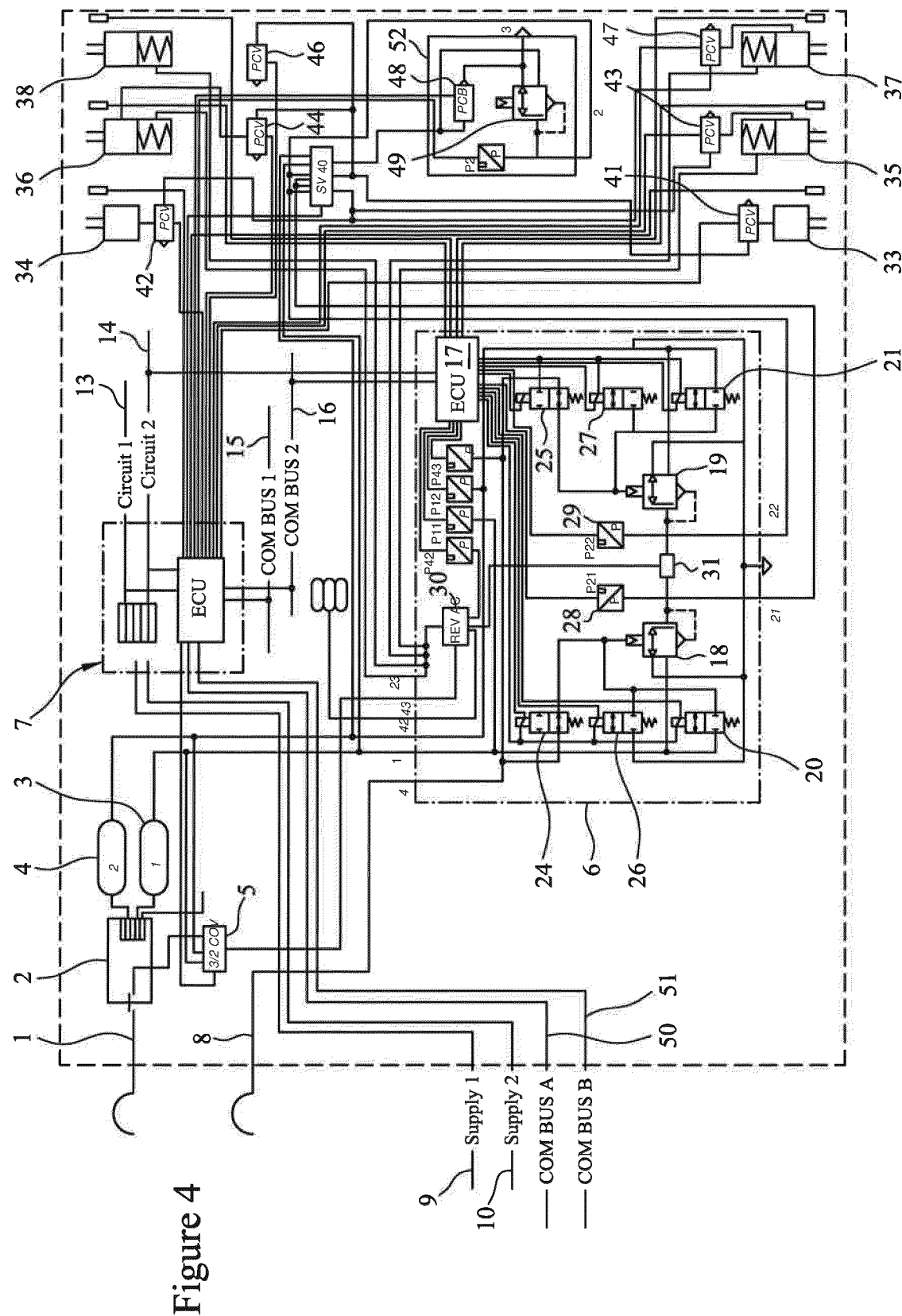
FIG. 4 shows a fourth embodiment of a trailer brake system.

FIG. 4 shows a further embodiment with a selection valve 40 and a secondary pressure modulator. In this case the pneumatic output of the trailer brake module is again fed to a selector valve 40, which also receives inputs from each of the first and second reservoirs. The selector valve controls the flow of air to the wheel ends via a respective pressure control valve assembly 41-46. Each of these is a combination of two 2/2 solenoid valves, one of which is normally open and the other normal closed (which connects out to exhaust). The pressure control valve assembly is electrically controlled via the main ECU 7.

The selector valve 40 is a set of two or three 3/2 valves that selects one source out of an available two for two different output channels. The first variant has two 3/2 valves and the service brake output of the trailer brake module connected to its four input ports. The four input ports connect to the two 3/2 valves so that each as one input from the first brake circuit and one from the second brake circuit. The output from the 3/2 valves connects to the output of the selection valve. The second variant has the functionality of the first variant and in addition a third 3/2 valve provides the same type of selection functionality for the two supply circuits.

The secondary brake module 52 is a one channel electro-pneumatic module comprises a 3/2 solenoid valve arrangement 48 and relay valve 49 that receives an input from the redline connection via selector valve 40 and provides an output back to the selector valve 40. This enables the secondary brake module to replace one of the channels of the trailer brake module 6 in the event of failure.

Figure 5:
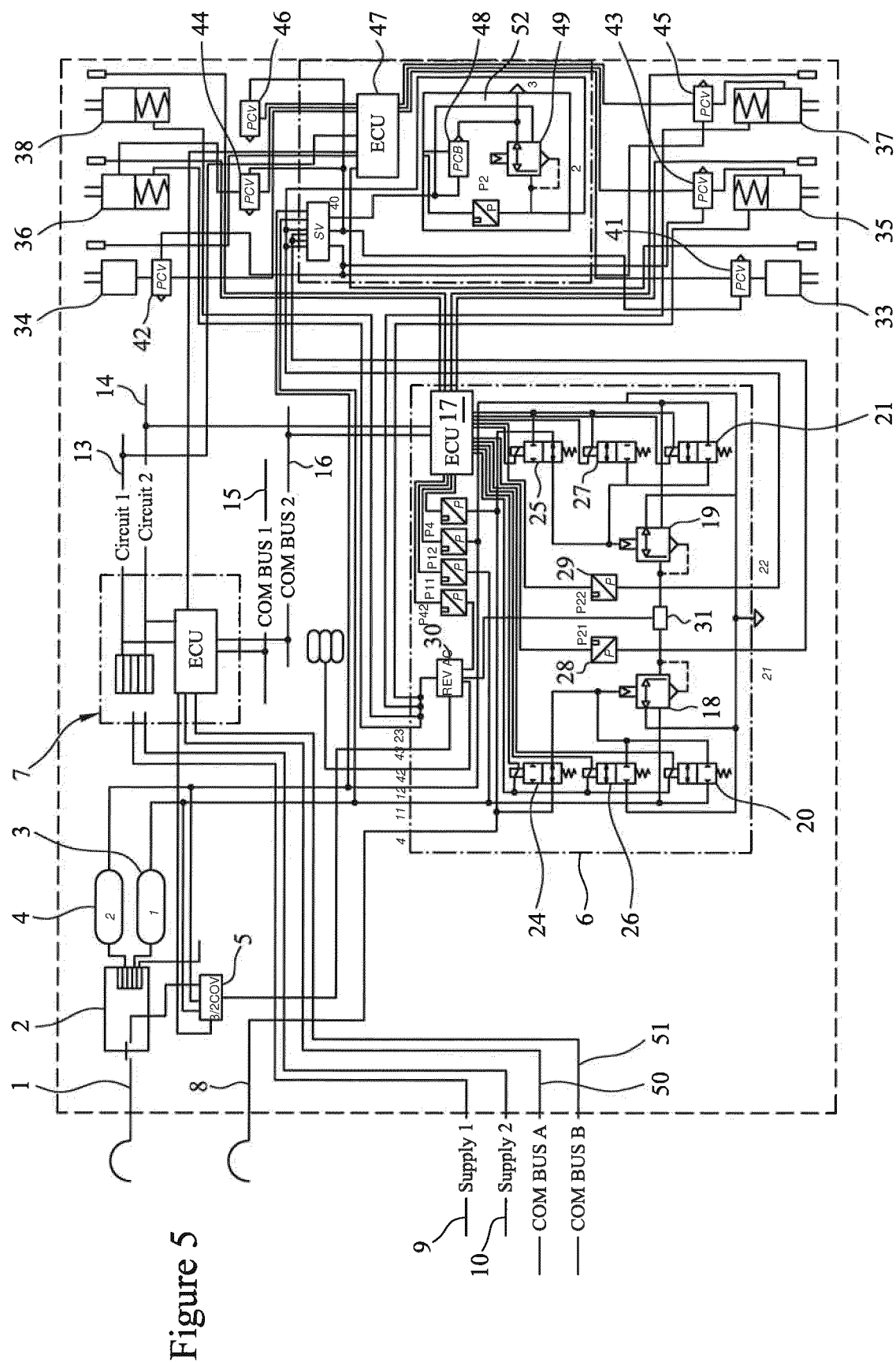
FIG. 5 shows a fifth embodiment of a trailer brake system.

The embodiment of FIG. 5 shows an alternative embodiment in which the selection valve 40 and the secondary pressure modulator are integrated into one component with integrated control provided by an ECU 47 rather than the ECU 7, which allows the wheel speed sensors and pressure control valves to connected to and control by the ECU 47. This results in a simpler interface and wiring harness.

The introduction of a selection valve can significantly improve performance. However, the relay valve might not be able to supply up to six wheels with sufficient pressure to provide full braking. This will result in longer response time and poorer ABS performance. Alternatively the relay valve would need to be over dimensioned which might not be technically or commercially viable. The introduction of a secondary pressure modulator aims to improve performance of the system even further. Together with an additional pressure modulator the selection valve is also expanded with an additional 3/2 valve. This additional valve selects the input source for the secondary pressure modulator so that it can be supplied from either circuit 1 or 2. The response strategy in Table 1 is still valid with one exception:

Fault Consequence/Response Strategy

Rupture of the main reservoir/TBM pneumatic failure
This will affect circuit 1 or 2. If circuit 1 is affected, the selection valve can be switched into a position so that the secondary pressure modulator is fed from circuit 2 and its output is fed to brake circuit 1.

If circuit 2 is affected, the selection valve will be switched into a position so that the secondary pressure modulator is fed from circuit 1 and its output is fed to brake circuit 2.

Figure 6:
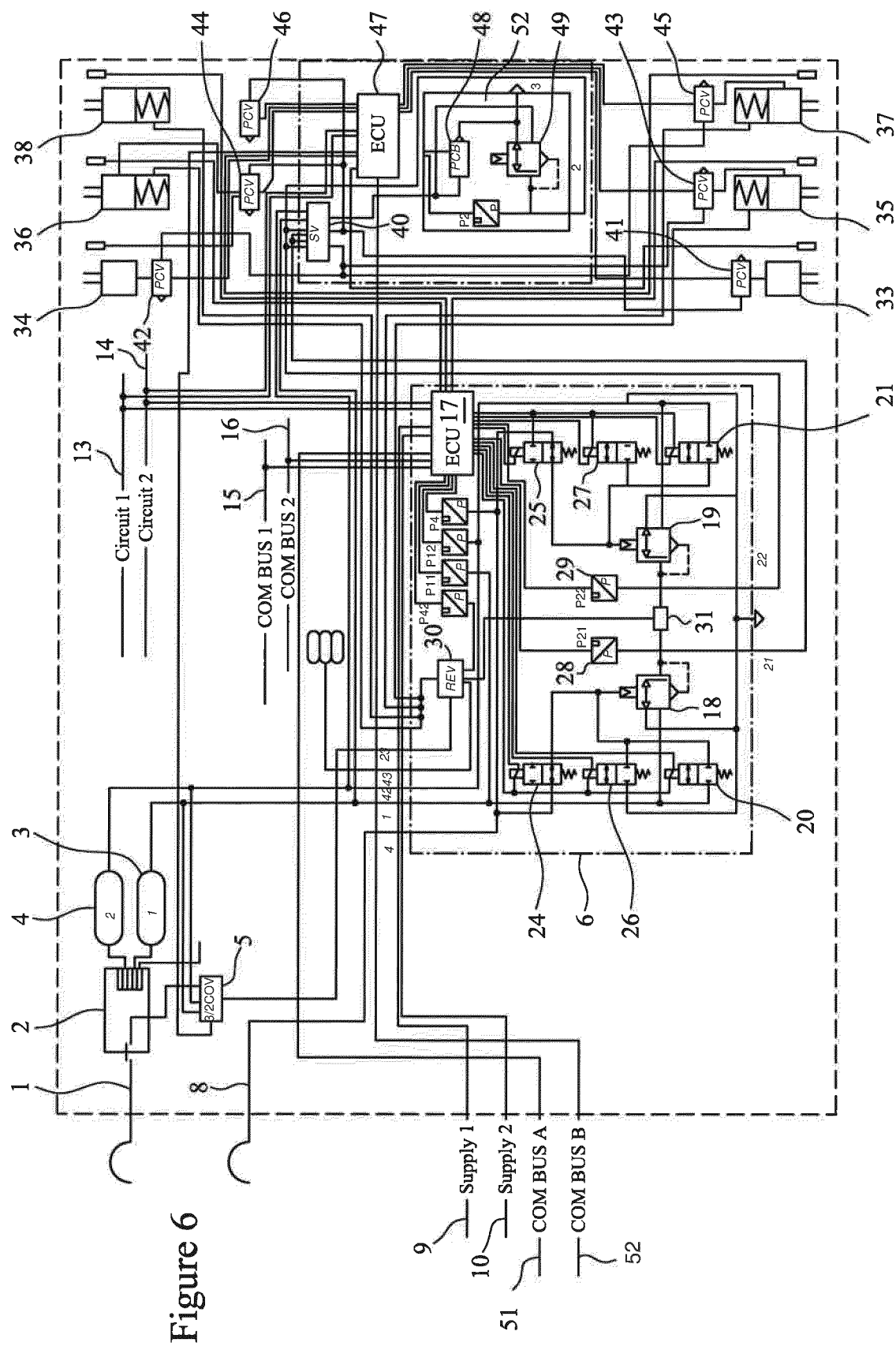
FIG. 6 shows a sixth embodiment of a trailer brake system.

FIG. 6 illustrates an alternative design in which the selection valve and the secondary pressure modulator are integrated in one component with integrated control. This allows the wheel speed sensors and the PCVs to be connected to this ECU. The advantage is a simpler interface and simplified wiring harness.

Figure 7:
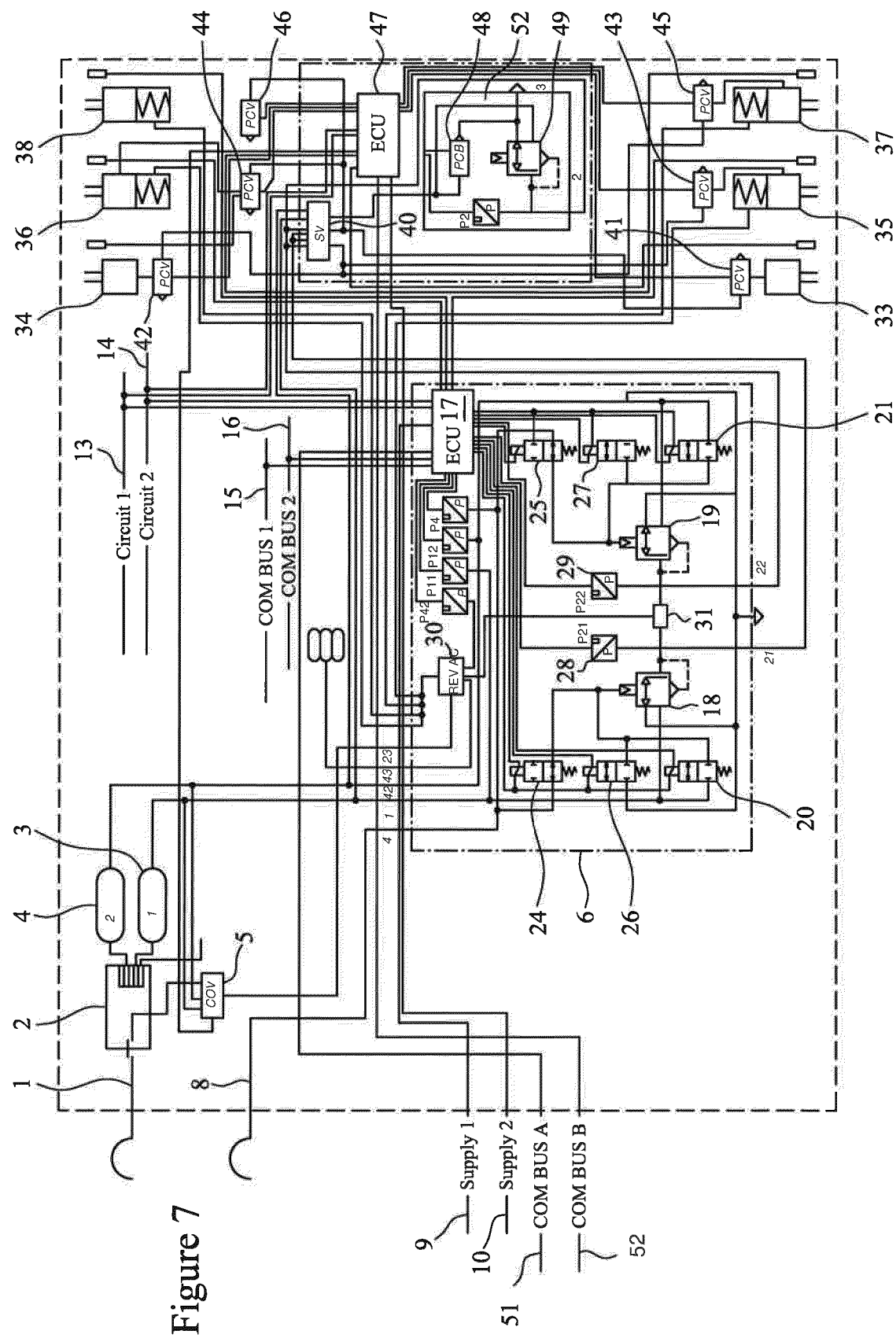
FIG. 7 shows a seventh embodiment of a trailer brake system.

FIG. 7 shows a further embodiment in which the functionality of the ECU 7 in FIGS. 1 to 6 is divided between the second pressure modulator with integrated control 47 and the main trailer brake module 6. The advantage of this distributed layout is that one ECU can be eliminated compared to the approach with ECU 12.

In this embodiment all of the redundancy management functions are allocated to the primary TBM. In this case the redundancy TBM is powered either by both circuits, or by a circuit buffered by a battery. This way its functionality is protected in the event of a power supply failure. Only the communication bus B to the towing vehicle is connected to the redundancy TBM. This layout allows all redundancy strategies outlined above.

The invention claimed is:

1. A trailer brake system for a trailer vehicle having a plurality of axles, each of said axles having a wheel end on a respective side of the vehicle, the brake system comprising:
   first and second pneumatic circuits for supplying air pressure to braking devices at the wheel ends, the air pressure to the wheel ends being controllable via a first brake ECU carried by the trailer vehicle;
   first and second pressure control valves on each of the respective sides of the vehicle, which pressure control valves control pressure from the pneumatic circuits to the respective wheel ends, wherein
   the system further comprises a second ECU carried by the trailer vehicle, which second ECU is adapted to electrically control actuation of the pressure control valves.

2. The trailer brake system according to claim 1, wherein wheel ends on first and second axles on the trailer are each provided with a spring brake, which is pneumatically connected to an output of a relay emergency anti-compounding valve, so that the spring brakes can be controlled independently of service braking.

3. The trailer brake system according to claim 1, wherein flow of air to the wheel ends is controlled via a first pressure control valve assembly for each wheel end of the front axle and a second pressure control valve assembly for each side wheel end of the rear axle or axles.

4. The trailer brake system according to claim 3, wherein each of the pressure control valve assemblies is a combination of two 2/2 solenoid valves, one of which is open and the other closed during service braking when no fault is present.

5. The trailer brake system according to claim 3, wherein the or each pressure control valve assembly is electrically controlled via the second ECU.

6. The trailer brake system according to claim 1, wherein the pneumatic output of a trailer brake module is fed to a selector valve, which selector valve controls the flow of air to the wheel ends via a respective pressure control valve assembly.

7. The trailer brake system according to claim 1, wherein the system has one pressure control valve assembly per wheel end.

8. A trailer brake system for a trailer vehicle having a plurality of axles, each of said axles having a wheel end on a respective side of the vehicle, the brake system comprising:

first and second pneumatic circuits for supplying air pressure to braking devices at the wheel ends, the air pressure to the wheel ends being controllable via a first brake ECU;

first and second pressure control valves on each of the respective sides of the vehicle, which pressure control valves control pressure from the pneumatic circuits to the respective wheel ends, wherein the system further comprises a second ECU, which second ECU is adapted to electrically control actuation of the pressure control valves, wherein the pneumatic output of a trailer brake module is fed to a selector valve, which selector valve controls the flow of air to the wheel ends via a respective pressure control valve assembly, and wherein the selector valve comprises two or three 3/2 valves which select one pressure source out of an available two, which pressure is for two different output channels.

9. A trailer brake system for a trailer vehicle having a plurality of axles, each of said axles having a wheel end on a respective side of the vehicle, the brake system comprising:

first and second pneumatic circuits for supplying air pressure to braking devices at the wheel ends, the air pressure to the wheel ends being controllable via a first brake ECU;

first and second pressure control valves on each of the respective sides of the vehicle, which pressure control valves control pressure from the pneumatic circuits to the respective wheel ends, wherein the system further comprises a second ECU, which second ECU is adapted to electrically control actuation of the pressure control valves; and a secondary brake module, which module is a one channel electropneumatic module comprising a 3/2 solenoid valve arrangement and a relay valve.

10. A trailer brake system for a trailer vehicle having a plurality of axles, each of said axles having a wheel end on a respective side of the vehicle, the brake system comprising:

first and second pneumatic circuits for supplying air pressure to braking devices at the wheel ends, the air pressure to the wheel ends being controllable via a first brake ECU;

first and second pressure control valves on each of the respective sides of the vehicle, which pressure control valves control pressure from the pneumatic circuits to the respective wheel ends, wherein the system further comprises a second ECU, which second ECU is adapted to electrically control actuation of the pressure control valves, wherein the pneumatic output of a trailer brake module is fed to a selector valve, which selector valve controls the flow of air to the wheel ends via a respective pressure control valve assembly, and wherein the selector valve and a secondary pressure modulator are integrated into one component with integrated control provided by a further ECU.

11. The trailer brake system according to claim 10, wherein the selector valve and the secondary pressure modulator are integrated in one component with integrated control, thereby allowing wheel speed sensors and pressure control valves to be connected to an ECU providing the integrated control.

* * * * *